(12) United States Patent
Gulliksen

(10) Patent No.: US 6,863,421 B2
(45) Date of Patent: Mar. 8, 2005

(54) LAMPHOUSE

(75) Inventor: Morten Gulliksen, Oslo (NO)

(73) Assignee: InFocus Corporation, Wilsonville, OR (US)

( * ) Notice: Subject to any disclaimer, the term of this patent is extended or adjusted under 35 U.S.C. 154(b) by 0 days.

(21) Appl. No.: 10/165,755

(22) Filed: Jun. 7, 2002

(65) Prior Publication Data

US 2003/0063464 A1 Apr. 3, 2003

Related U.S. Application Data

(60) Provisional application No. 60/296,726, filed on Jun. 11, 2001.

(51) Int. Cl.[7] ................................................. B60Q 1/06
(52) U.S. Cl. ........................ 362/373; 362/294; 362/345
(58) Field of Search ................................. 362/373, 294, 362/362, 345, 547, 580; 313/24, 13, 46, 11

(56) References Cited

U.S. PATENT DOCUMENTS

| | | | | | |
|---|---|---|---|---|---|
| 4,572,164 A | * | 2/1986 | Yoshida et al. | ............. | 600/178 |
| 4,630,182 A | * | 12/1986 | Moroi et al. | ................ | 362/294 |
| 4,922,385 A | * | 5/1990 | Awai | ........................... | 362/580 |
| 5,064,395 A | * | 11/1991 | Kling et al. | .................. | 445/27 |
| 5,111,367 A | * | 5/1992 | Churchill | .................... | 362/554 |
| 5,207,505 A | * | 5/1993 | Naraki et al. | ............... | 362/373 |
| 5,285,363 A | * | 2/1994 | Meuse | ........................ | 362/293 |
| 5,335,154 A | * | 8/1994 | Koitabashi et al. | ......... | 362/294 |
| 5,672,931 A | * | 9/1997 | Kiss et al. | ..................... | 313/44 |
| 5,961,203 A | * | 10/1999 | Schuda | ........................ | 362/294 |
| 6,004,010 A | * | 12/1999 | Inage et al. | ................. | 362/294 |
| 6,179,446 B1 | * | 1/2001 | Sarmadi | ..................... | 362/264 |
| 6,224,248 B1 | * | 5/2001 | Chiba | ......................... | 362/580 |
| 6,227,686 B1 | * | 5/2001 | Takahashi et al. | .......... | 362/345 |
| 6,340,237 B1 | * | 1/2002 | Koga et al. | ................. | 362/294 |
| 6,435,699 B2 | * | 8/2002 | Glowach et al. | ............ | 362/294 |
| 6,498,423 B1 | * | 12/2002 | Bell et al. | ..................... | 313/24 |
| 2002/0136028 A1 | * | 9/2002 | Smith | .......................... | 362/580 |
| 2003/0058656 A1 | * | 3/2003 | Yamaguchi | ................. | 362/547 |

* cited by examiner

*Primary Examiner*—Sandra O'Shea
*Assistant Examiner*—John Anthony Ward
(74) *Attorney, Agent, or Firm*—Schwabe, Williamson & Wyatt, P.C.

(57) ABSTRACT

A lamphouse (100) is configured to accommodate and cool an image projector lamp (300). The lamphouse receives through an air intake opening (111) cool airflow ($A_1$) drawn by a fan and is equipped with an internal chamber (130) and plural internal fins (120). Plural exhaust openings (110) on the downstream side of the lamp reflector (310) and burner (310) are arranged essentially perpendicular to the direction of flow of air ($A_1$) heated by the lamp and such that, when the airflows from the surroundings ($A_1$) and ($A_2$) are mixed in the area immediately after the lamphouse, a resulting airflow ($A_3$) will, upon reaching projector exhaust openings (410), have a substantially uniform and relatively low temperature. The exhaust openings (110) are configured so that the heated airflow is mixed with the cooler airflow before striking the projector chassis reaching the projector exit grill.

17 Claims, 5 Drawing Sheets

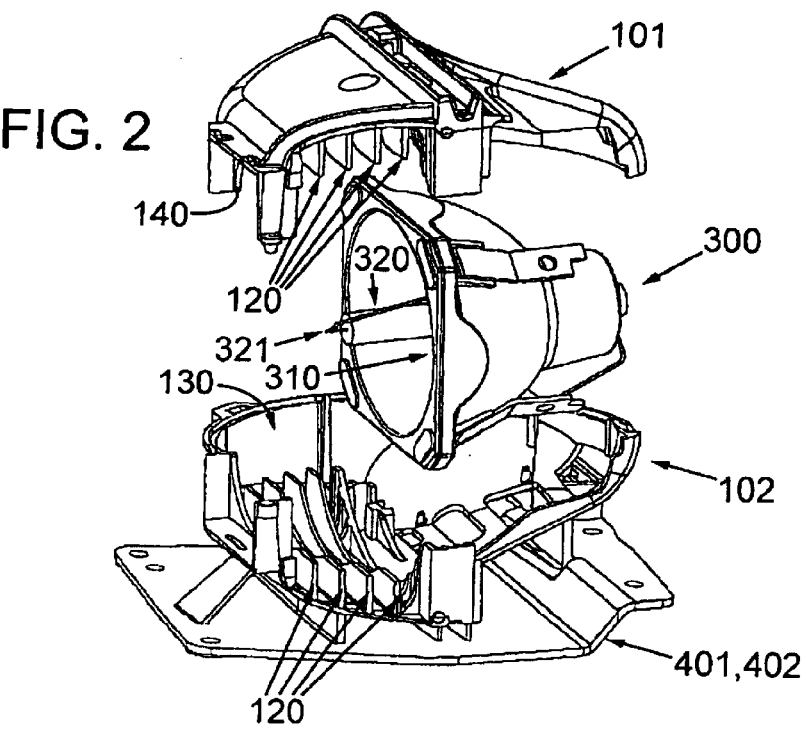
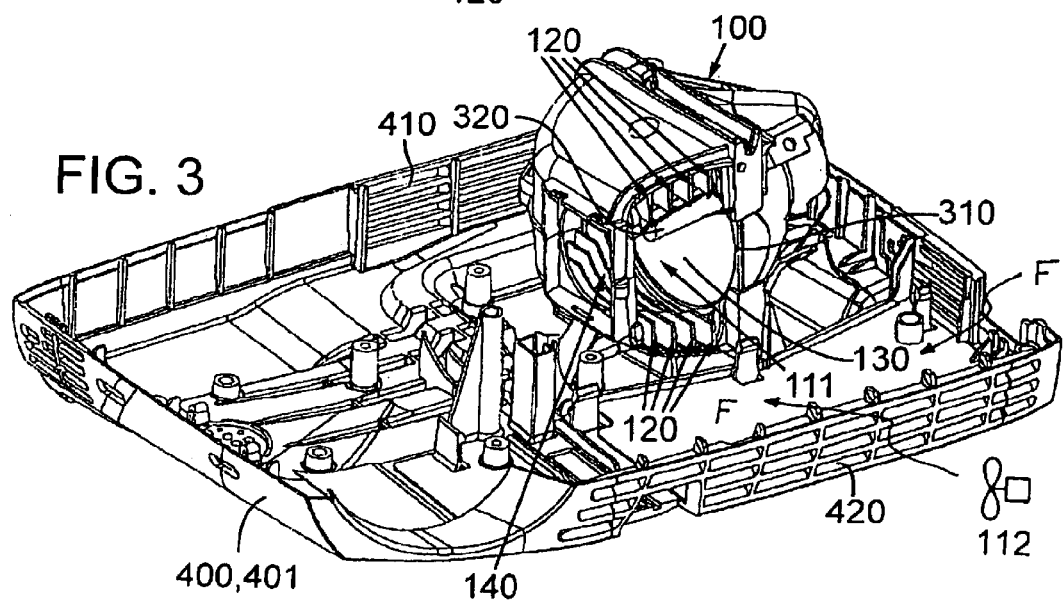

LAMPHOUSE

RELATED APPLICATION

This application claims the benefit of U.S. Provisional Patent Application No. 60/296,726, filed Jun. 11, 2001.

TECHNICAL FIELD

The present invention relates to a device for use in cooling lamps and, more specifically, to a lamphouse so designed that a lamp in, for example, an image projector can be optimally cooled by a fan of suitable type.

BACKGROUND OF THE INVENTION

Today there is market demand for increasingly noiseless and compact projectors. Because it is desirable to maintain the light intensity despite the diminishing size of an image projector and because there do not appear to be imminent changes in relevant optical technology, the amount of heat generated by a projector will not appreciably change for the foreseeable future. To reduce to an acceptable level the heat generated by the lamp, a certain amount of heat must be removed from the projector per time unit. The integral product of volume flow and temperature increase across the openings in the projector chassis (i.e., the exit grill) is expressed as:

$$\int \Delta T_{in-out} \, C_p \, p \cdot v dA.$$

The air flowing out of the projector should not exceed a temperature of 95° C. because this is the highest permissible temperature on the surface of a plastic exit grill.

A known problem with currently available projectors is that the air flowing out of the lamp reflector becomes very hot (200° C.–300° C.). To prevent it from heating the exit grill to more than 95° C., this hot air is mixed with cold air in a turbulent flow inside the projector. Since the projector size is to be as small as possible, such mixing needs to be done over very short distances. The device according to the invention permits efficient cooling of this kind and requires neither much space nor high air velocities. Low air velocities are desirable because they cause little energy loss in turbulence and hence little noise. To obtain minimum air velocities, all of the air exiting the exit grill should be close to the maximum temperature allowed. On the other hand, it is important that the cold airflow intended for mixing with the hot air remain along the length the projector chassis until the cold airflow reaches the exit grill, thereby preventing the surface from becoming uncomfortably hot to touch.

Another cooling problem that must be solved is keeping the temperature of the lamp tip (burner tip) from becoming excessively high. A certain airflow must, therefore, be conveyed past the lamp tip to prevent it from overheating and failing.

SUMMARY OF THE INVENTION

The device according to the invention solves the above-described problems in an almost ideal manner. The invention is a lamphouse that includes a plurality of fins arranged on the inner surface of the lamphouse, essentially in the area defining the lamphouse chamber. The lamphouse according to the invention also includes a plurality of exhaust openings located on the downstream side of the reflector and the burner. The exhaust openings are arranged substantially perpendicular to the direction of flow of the heated air and in such manner that, when the airflow from the surroundings (which has a temperature approximately equal to the temperature of the air outside the projector) and the heated airflow are mixed in the area immediately after the lamphouse, the resulting airflow will, upon reaching exhaust openings of the projector, have a substantially uniform temperature, preferably lower than 95° C.

The internal shape of the lamphouse is complementary to the shape of the lamp and reflector so that heat generated by the lamp burner and reflector is essentially transported out of the exhaust openings in the airflow, thereafter to be mixed with the substantially cold airflow. The exhaust openings are configured in such a manner that the heated airflow does not strike the projector chassis before the heated airflow has been mixed with the cooler airflow and before it reaches the exit grill. The exhaust openings are configured in such a manner that the heated air is efficiently mixed with the cooler air and does not circulate around the lamphouse. The lamphouse defines an internal flow cross-section that gives a virtually constant airflow velocity from the chamber to and though the respective exhaust openings. The effective flow resistance of the lamphouse in the cold airflow is minimal.

The device according to the invention will now be described with reference to the attached drawings, which show the principal features and an embodiment of the invention. It will be understood that the drawings show only alternative exemplary embodiments and that they should not, therefore, be understood as defining the limits of the invention. In the drawings, the relevant parts are indicated by reference numerals that will also be used in the following detailed description.

BRIEF DESCRIPTION OF THE DRAWINGS

FIG. 1 is a schematic diagram of the device according to the invention in which:

FIG. 2 is a perspective exploded view of an embodiment of the device according to the invention, as seen in the general downstream direction.

FIG. 3 is a perspective view of the device in FIG. 2, also as seen in the general downstream direction but in an assembled stated and mounted in a portion of the projector chassis.

DETAILED DESCRIPTION OF THE PREFERRED EMBODIMENT

Figure 1A:
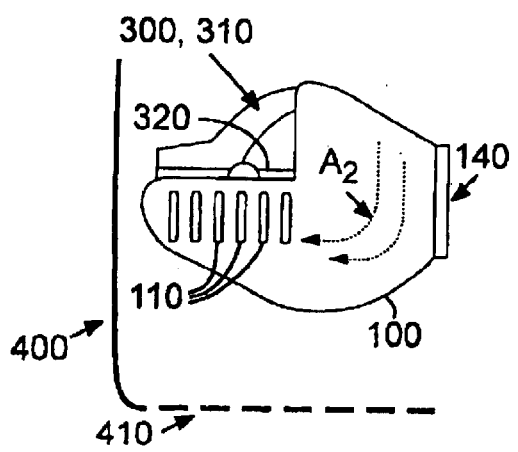
FIG. 1a is a partly cutaway top view showing a lamp and burner mounted in the inventive lamphouse, the inside of the lamphouse, and a section of the projector chassis and indicating the internal flow in the lamphouse.

With reference to the drawings, the device according to the invention comprises a lamphouse 100, which in an alternative embodiment may be composed of an upper half 101 and a lower half 102. Lamphouse 100 is equipped with an air supply opening 111 on the upstream side and a plurality of exhaust openings 110 on the downstream side. The terms "upstream" and "downstream" and used in a conventional manner here and in relation to the general flow direction of the air. Lamphouse 100 comprises internal fixing devices for receiving and fixing a lamp 300. As is well known, lamp 300 comprises a reflector 310 and a burner 320 with burner tip 321. Lamphouse 100 defines an internal chamber 130 located in front of lamp reflector 310 and burner 320. Plural fins 120 are arranged on the inner surface of lamphouse 100, essentially in the area defining chamber 130 and extending essentially in a transverse direction to the longitudinal axis of burner 320. At its distal end in relation to burner 320, chamber 130 ends in an opening 140 through which light emitted by lamp 300 propagates for the purpose of generating images in a way that is known.

Figure 1B:
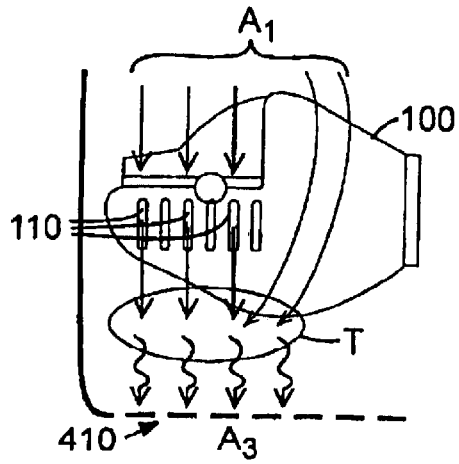
FIG. 1b is a top view showing the same details as FIG. 1a and outlining the external flow across the outer surface of the lamphouse, together with the turbulent area.
Figure 1C:
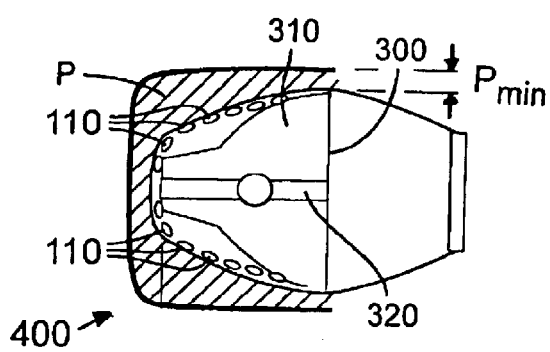
FIG. 1c is a partly cutaway side view as seen in the upstream direction.
Figure 1D:
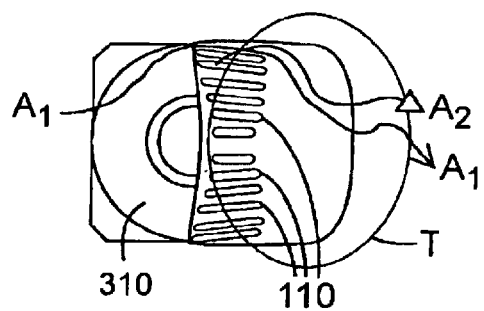
FIG. 1d is a front view that shows, among other features, the upper and lower exhaust openings and indicates the turbulent zone.
Figure 1E:
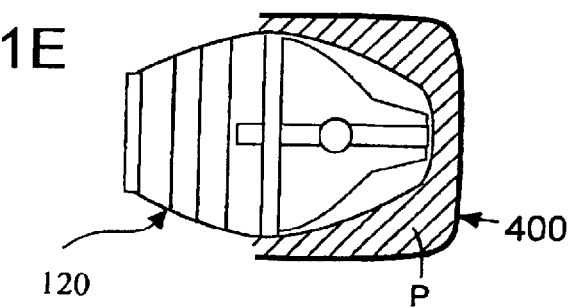
FIG. 1e is a partly cutaway side view as seen in the downstream direction.
Figure 4:
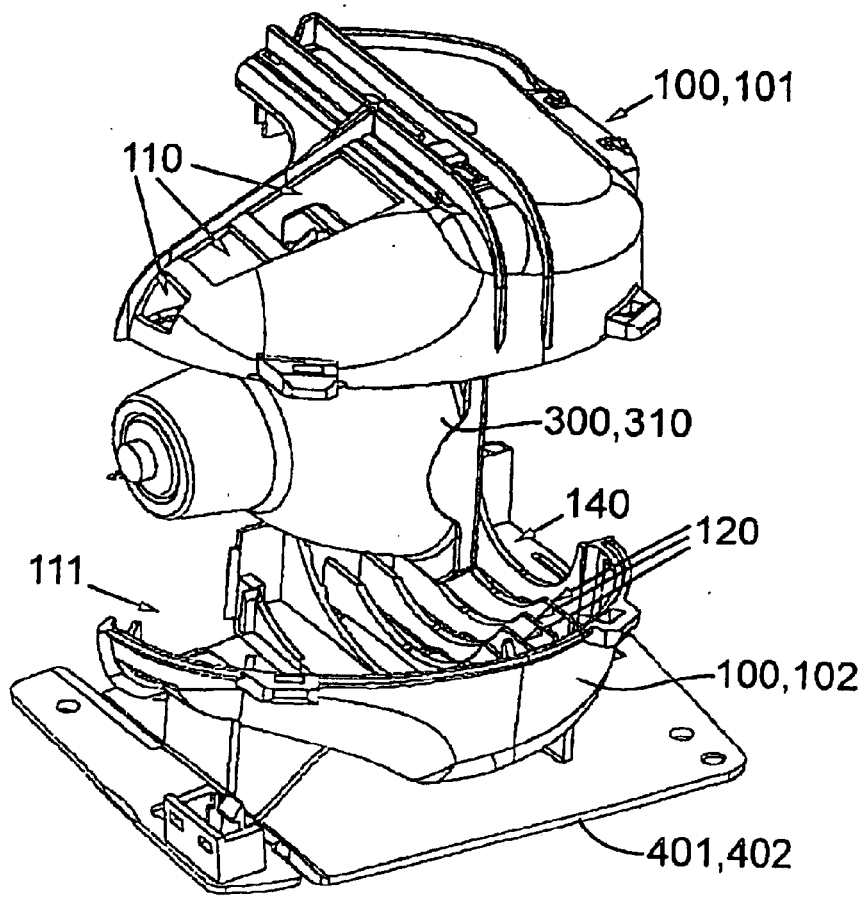
FIG. 4 is a perspective exploded view of the device in FIG. 2, as seen in the general upstream direction.
Figure 5:
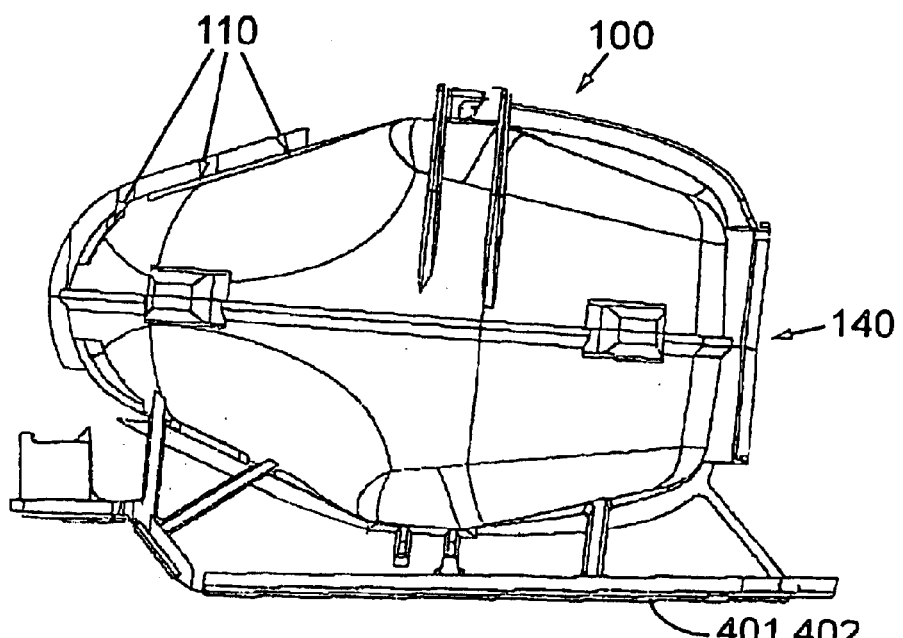
FIG. 5 is a side view of the device in FIG. 2, as seen in the general upstream direction.
Figure 6:
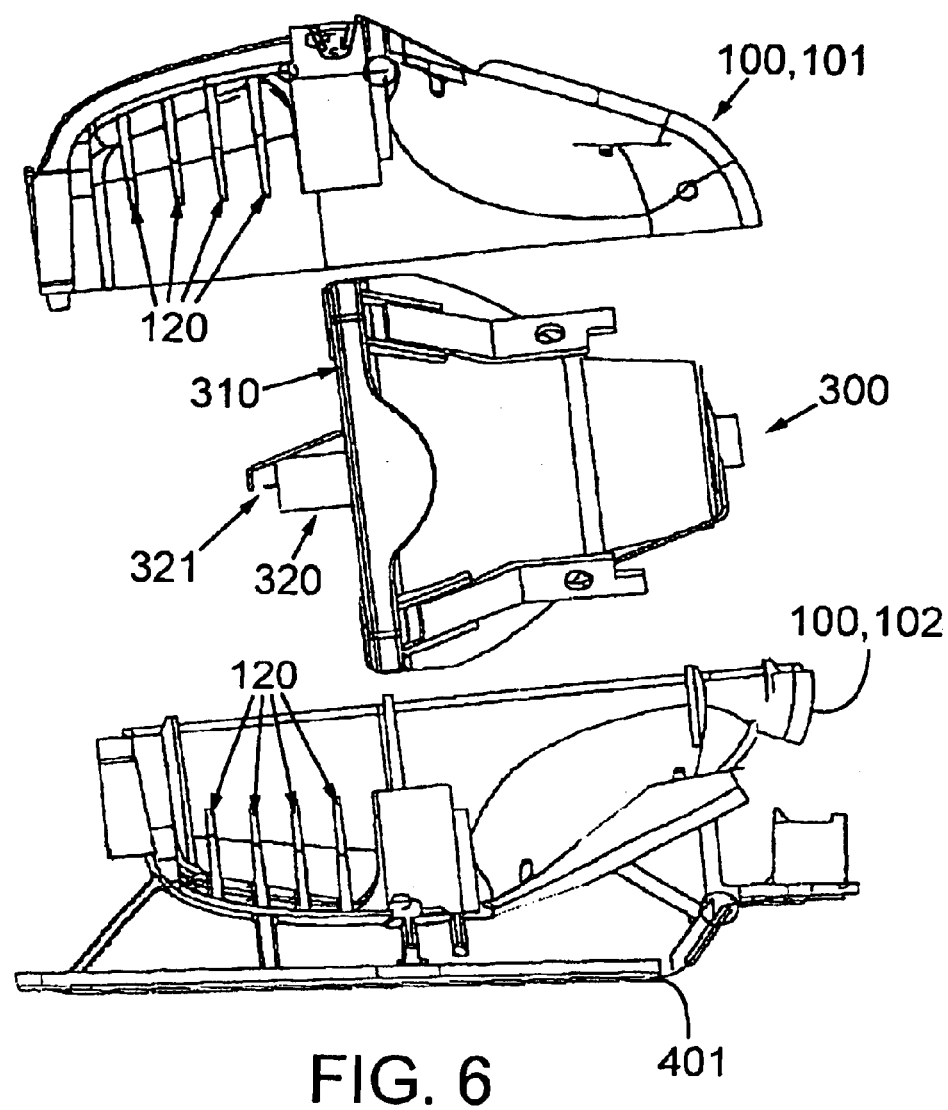
FIG. 6 is an exploded view of the device as shown in FIG. 2, as seen in the general downstream direction.
Figure 7:
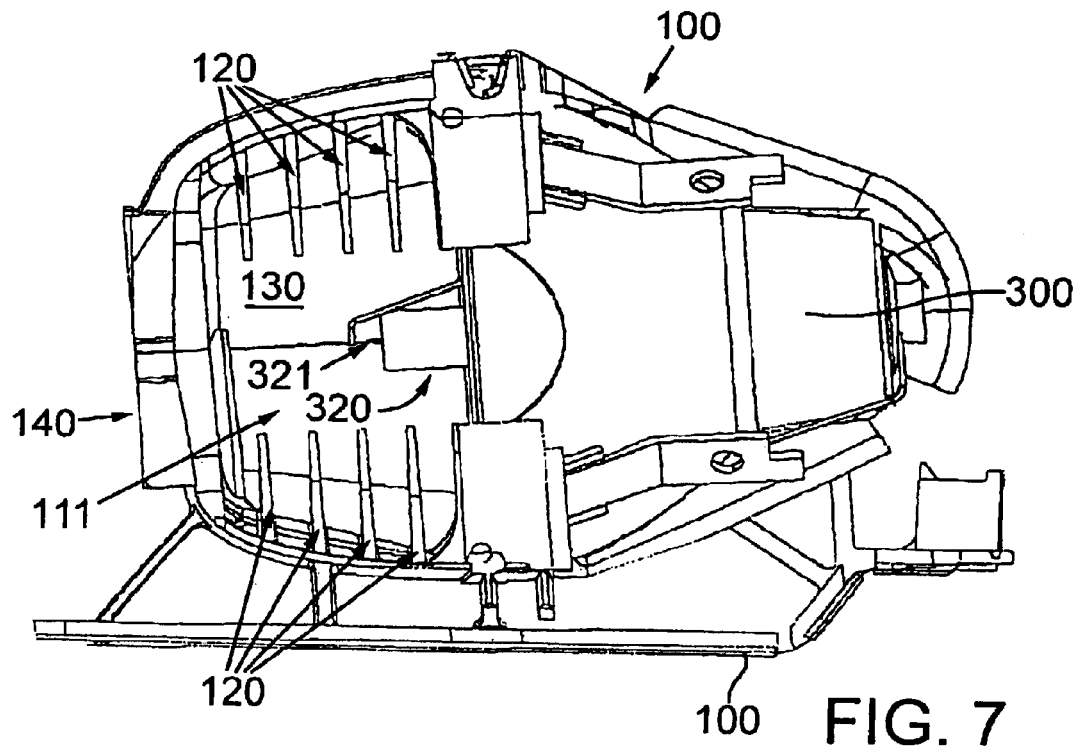
FIG. 7 is a side view of the device according to FIG. 2, as seen in the general downstream direction.
Figure 8:
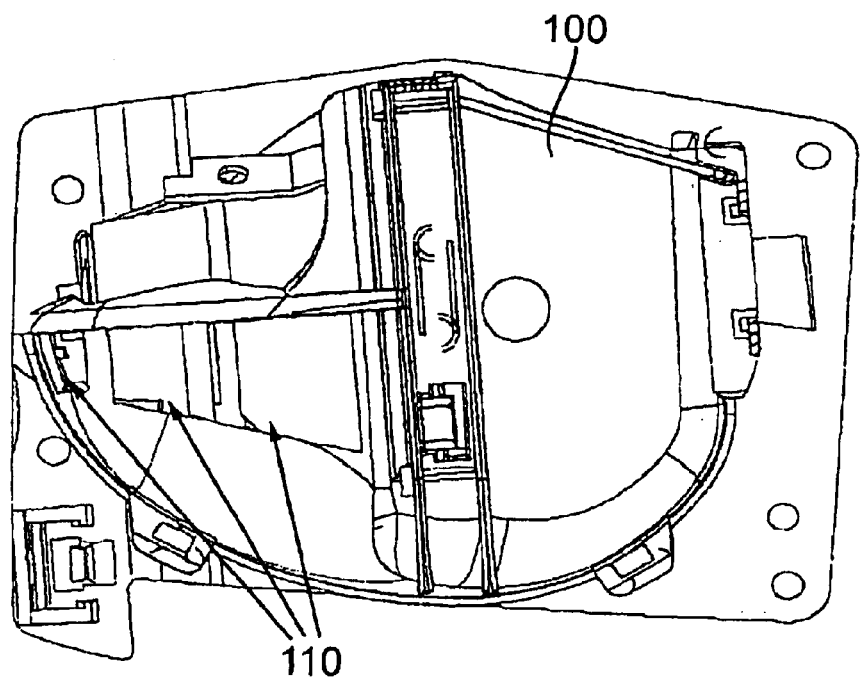
FIG. 8 is a top view of the device in FIG. 2.

According to one embodiment, lamphouse 100 with lamp 300 installed can be mounted in a projector chassis 400 (only a section is shown in FIG. 3), for example, more specifically in a bottom portion 401 of projector chassis 400 (only a section is shown), optionally with the use of a bracket 402. Projector chassis 400 comprises on the upstream side of lamphouse 100 one or more air intake openings (inlet grill) 420 (FIG. 3), where air $A_1$ (FIG. 1) is drawn in from the surroundings by means of fans (not shown) generally arranged in area F (FIG. 3). The intake air is passed into and around lamphouse 100 in a manner that will be described in more detail below. Projector chassis 400 further comprises on the downstream side of lamphouse 100 one or more exhaust openings (exit grill) 410 (FIG. 3), where heated and "mixed" air $A_3$ is discharged from the projector. The heated air $A_3$ is a mixture of air $A_1$ that flows around lamphouse 100 and is not heated to an appreciable degree and air $A_2$ that flows out of lamphouse 100 after being directly or indirectly heated by lamp burner 320.

To provide lamphouse 100 with the right flow conditions, air is blown from the whole of one side. This can be done, for example, with two axial fans (not shown) mounted at an area F next to lamphouse 100. A positive pressure is then created inside chamber 130 in front of lamp 300, which has an intake opening 111 facing the fans. The air then flows past burner 320 and reflector 310, where the air is exposed to intense heating. The air then moves lightly around the lamp corner and out of a number of slits or exhaust openings 110. The air flows outwardly in a transverse direction to the flow that skims across the outside of the rear part of lamp 300 or lamphouse 100. The mixing with the cold air starts as soon as the hot air $A_2$ flows from slits 110 and into the turbulent area T (FIG. 1). Because the flow cross-section P between lamphouse 100 and projector chassis 400 is at a minimum of $P_{min}$ immediately before slits 110 and because the flow cross-section increases where slits 110 begin, the air that rises from slits 110 will not be subjected to a positive pressure but will instead be able to flow upward freely. Thin fins 120 positioned inside lamphouse chamber 130 convert radiant heat to hot air that is then transported out through slits 110.

The shape and size of the exhaust openings are determined with care. To obtain optimal performance, this determination is made at the end of the development phase of the projector after the incoming flow pattern from the fans and the surrounding geometry has been established. To ensure the hot air (about 200° C.) that arises from slits 110 neither rushes upwards nor remains around lamphouse 100 like a hot shroud and strikes the exit grill 410 in an unmixed state, slits 110 have a defined cross-section (e.g., elongate in one embodiment) and are suitably spaced apart. The objective of the mixing is that all air coming from the mixing area is as close as possible to the maximum permissible temperature as the air reaches exit grill 410. Because of a strong upward movement of hot air, a larger part of the hot air will enter upper slits 110. The size of upper openings 110, and as a consequence the air flow therefrom, is reduced to ensure that the heat emitted through the upper and lower openings 110 is about equal.

It will be obvious to those having skill in the art that many changes may be made to the details of the above-described embodiments of this invention without departing from the underlying principles thereof. The scope of the present invention should, therefore, be determined only by the following claims.

What is claimed is:

1. A lamphouse comprising:

a first area including a plurality of exhaust openings and an internal shape to complement the shape of a lamp;

a second area, substantially adjacent to the first area, including an internal chamber, a plurality of fins arranged on a portion of an inner surface of the internal chamber; and the internal chamber and internal shape are designed to facilitate an air flow between the internal chamber and the plurality of exhaust openings.

2. The lamphouse of claim 1 further comprising:

an axis on which the internal shape of the first area is substantially centered, and further traveling through the internal chamber; and a light opening situated on the axis, at a distal end of the internal chamber from the first area, to allow for light to be emmited.

3. The lamphouse of claim 2, wherein the plurality of fins are substantially parallel with one another.

4. The lamphouse of claim 3, wherein the plurality of fins are arranged essentially transverse to the axis.

5. The lamphouse of claim 2, further comprising an air intake opening into the internal chamber to at least facilitate an intake flow of air generally parallel to the plurality of fins.

6. The lamphouse of claim 2, wherein the plurality of exhaust openings are arranged essentially transverse to the plurality of fins.

7. The lamphouse of claim 2, wherein the plurality of exhaust openings are arranged symmetrically in relation to the axis.

8. The lamphouse of claim 1, wherein the plurality of exhaust openings include top and bottom exhaust openings, and characterized in that the top exhaust openings have cross-sections that are smaller than cross-sections of the bottom exhaust opening.

9. A method of comprising:

operating a lamp disposed within a first area of a lamphouse, the lamp to generate heat:

absorbing at least a portion of the heat with a plurality of fins disposed in a second area of the lamphouse;

creating a pressure differential to at least facilitate an internal air flow from the second area of the lamphouse to the first area, the air flow to transfer at least a portion of heat radiated from at least a selected one of the plurality of fins and the lamp, out of a plurality of exhaust openings in the first area of the lamphouse.

10. The method of claim 9, wherein creating a pressure differential is facilatated by a fan located adjacent to an opening in the second area of the lamphouse, the internal air flow traveling, for at least some distance, substantially parallel with the plurality of fins.

11. The method of claim 10, wherein the pressure differential additionally facilitates an external air flow laminar to the external surface fo the lamphouse.

12. The method of claim 11, further comprising:

creating a discharge air flow by mixing a portion of the external air flow with a portion of the internal air flow, exiting through the plurality of exhaust openings, in a turbulent area adjacent to the plurality of exhaust openings.

13. A system comprising:

a lamp;

a lamphouse having a first area including a plurality of exhaust openings and an internal shape to complement the shape of the lamp;

a second area, substantially adjacent to the first area, including an internal chamber, a plurality of fins arranged on a portion of an inner surface of the internal chamber; and the internal chamber and the internal shape being designed to facilitate a first air flow between the internal chamber and the plurality of exhaust openings; and a chassis coupled to the lamphouse, to facilitate a second air flow around the lamphouse.

14. The system of claim 13, wherein the chassis includes an inlet grill to facilitate an intake of air and an exit grill to facilitate an exhaust of air and the system further comprises.

15. The system of claim 13, wherein the lamphouse and the chassis are designed to facilitate the combination of the first and second air flows to form a third air flow to be exhausted through the exit grill.

16. The system of claim 13, wherein the chassis further includes a chassis wall, and the lamphouse is coupled to the chassis in such a manner that a flow-section is formed between the lamphouse and the chassis wall, and that the flow cross-section has a minimum value near the first and the second areas interface.

17. The system of claim 16, wherein the flow cross-section gradually increases adjacent to the exhaust openings in proportion to the distance to the first and second area interface.

* * * * *